Dec. 20, 1966 — P. G. STENGEL — 3,292,305
MUSHROOM CULTIVATION
Filed Sept. 29, 1964 — 4 Sheets-Sheet 2

INVENTOR.
Paul G. Stengel
BY
Paul & Paul
ATTORNEYS

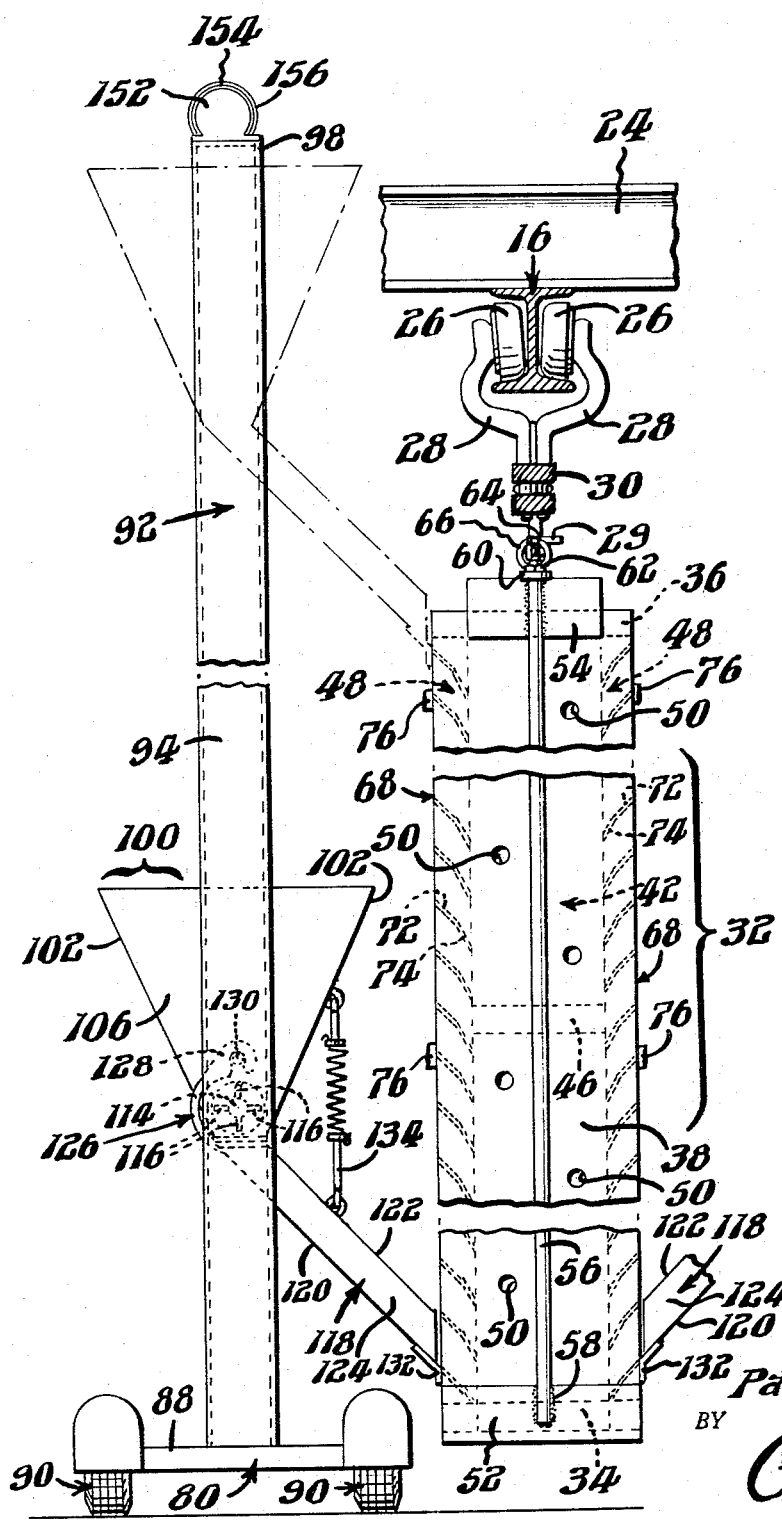

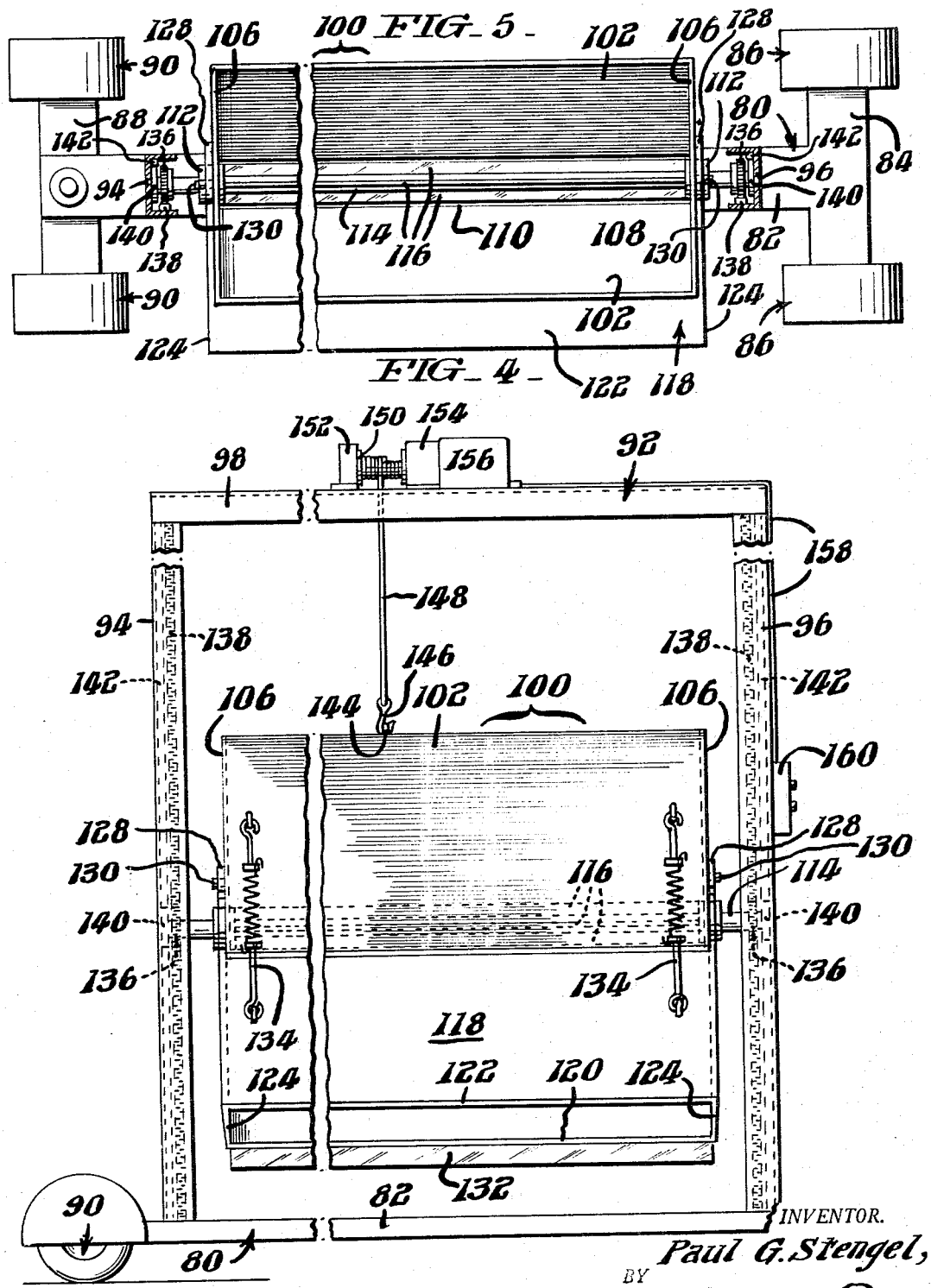

United States Patent Office 3,292,305
Patented Dec. 20, 1966

3,292,305
MUSHROOM CULTIVATION
Paul G. Stengel, R.D. 2, Kennett Square, Pa. 19348
Filed Sept. 29, 1964, Ser. No. 400,053
4 Claims. (Cl. 47—1.1)

This invention relates generally to mushroom cultivation and particularly to improvements in apparatus for cultivating mushrooms on a commercial basis.

The cultivation of mushrooms on a commerical basis in accordance with present day practices has not proved to be entirely satisfactory for a number of reasons. For one thing, the bed area per unit of available space is unduly limited. A building 36 feet wide and 66 feet long, for example, may be fitted with a system of stationary shelves arranged to provide approximately 8,000 square feet of bed area. By using a system of movable trays, instead of a system of stationary shelves, the bed area may be increased by approximately 30 percent. But even a system of movable trays affords a bed area which is unduly restricted for cultivation of mushrooms on a commercial basis.

Another reason is that it takes so long to grow a crop that normally an operator is able to grow only two crops a year, filling his houses in September for the first crop, and completing the second crop with the advent of warm weather in the spring. After the compost is partially conditioned and placed on the bed, it must go through a pasteurization period. The heat generated by the bacterial action in the compost, in combination with the moisture, causes the temperature to rise and the resulting pasteurization brings about a final conditioning of the compost, as well as killing off any insects or molds which may have entered the house during the filling process. Pasteurization takes approximately two weeks and is followed by planting of the spawn. The spawn grows through the compost in approximately three weeks. Then the beds are covered with a layer of casing soil. Approximately three weeks after the beds are cased the first mushrooms appear. The cropping period extends over a period of approximately three months. In view of the foregoing, it should be obvious why an operator normally is able to grow only two crops a year.

Still another reason is that when a crop is grown in horizontally extending stationary shelves or movable trays, normally an undue amount of labor is necessary to load and unload the shelves or trays. In addition, the operator must bend over the shelves or trays to plant the spawn, pick the mushrooms, and water, clean and dirt the beds.

Yet another reason is that watering the beds normally is a manual operation. The beds must be maintained in properly moistened condition, this being essential to the successful growth of a crop. But only a highly skilled operator can measure up to the responsibility. He must be vigilant night and day and very sensitive to the condition of the beds. When he detects the need for water, he must exercise infinite patience and care in administering it. This is difficult to do when the beds must be sprayed manually with only the good judgment of the operator to guide him in effecting an even distribution of the water which may be required.

Accordingly, an important object of the invention is to provide an improved apparatus for cultivating mushrooms on a commercial basis.

Another object is to provide such apparatus whereby a number of frames may be loaded with mushroom compost, up-ended and arranged in a given storage area or growing room in a manner which affords substantially increased bed area per unit of available space.

Another object is to provide such apparatus whereby cropping and pasteurization take place in separate rooms so that the cropping period for a first full complement of frames and the pasteurization period for a second full complement of frames may run simultaneously, whereby to materially reduce the time for cultivating each crop.

Another object is to provide such apparatus whereby the spawn carrier is broadcast on oppositely facing surfaces of the compost body and grows inwardly from both surfaces to materially reduce the spawn-running period.

Another object is to provide such apparatus whereby materially increased bed area is made available per unit of compost volume, and mushrooms are grown and picked on both sides of the frame so that a given yield may be obtained in materially less time than required heretofore, thus reducing the chance that disease may develop before a good yield is obtained.

Another object is to provide such apparatus whereby much less labor is required for loading and unloading the frames than is required for loading and unloading stationary shelves or movable trays.

Another object is to provide such apparatus whereby the operations of broadcasting the spawn carrier, casing the frames, picking the mushrooms and watering, cleaning and dirting the beds are facilitated.

Another object is to provide such apparatus whereby watering is done mechanically, not manually, so that whatever water is required is sprayed evenly over the beds.

Other objects of the invention will become apparent when the following description is read with reference to the accompanying drawings, in which:

FIGURE 3 is an end view of the frame shown in FIGURE 2, showing the frame in the process of being cased;

FIGURE 4 is a side view of the casing machine; and

FIGURE 5 is a plan view of the casing machine.

Figure 1:
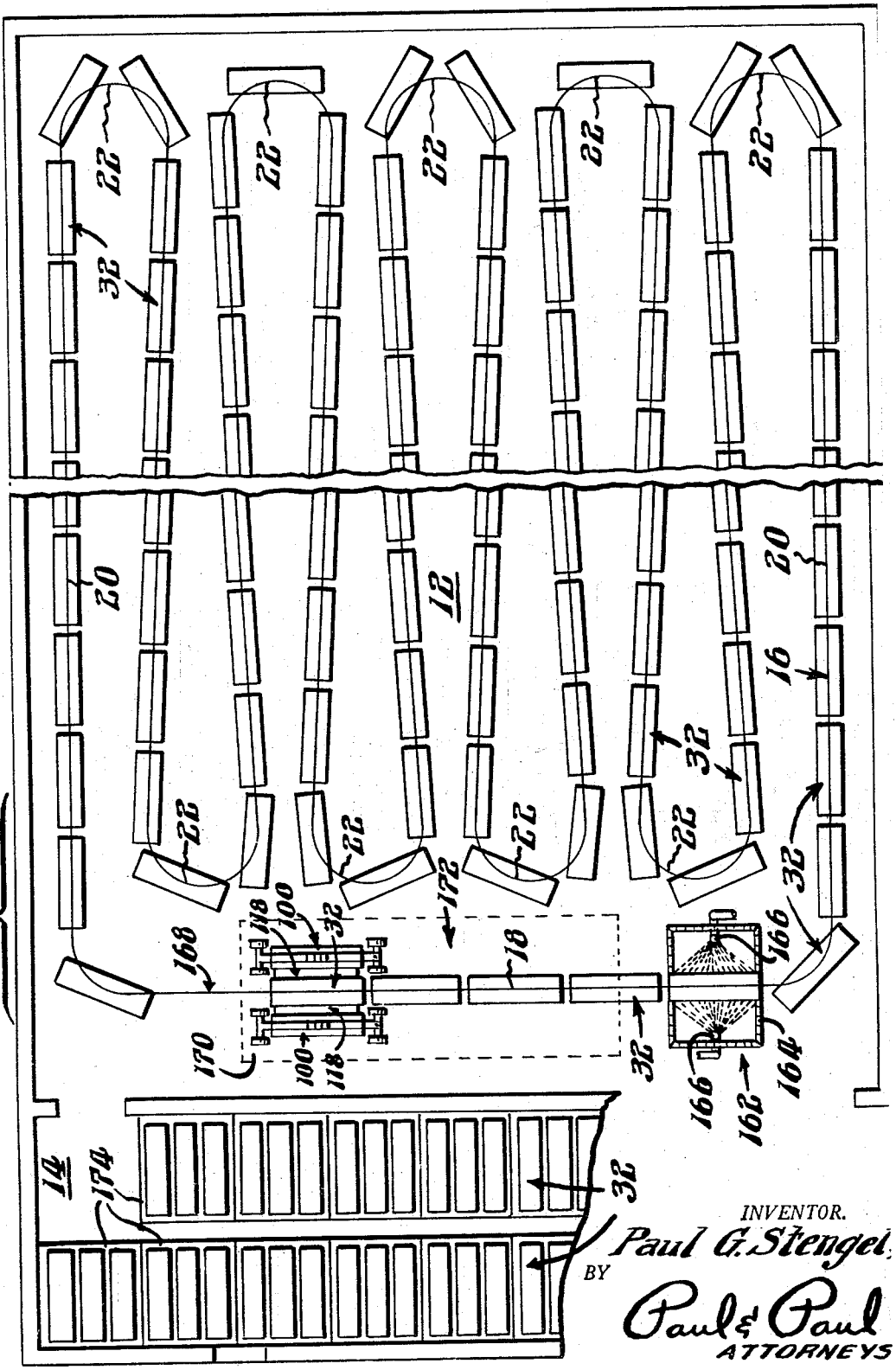
FIGURE 1 is a plan view of a mushroom house showing a full complement of frames arranged in the growing room and another full complement of frames arranged in the pasteurization room.

Referring particularly to FIGURE 1, a mushroom house, generally designated 10, is provided with a growing room 12 and a pasteurization room 14. The pasteurization room is fitted with a trolley conveyor system including an endless track 16. A section of the track, designated 18, extends across the front of the growing room, and other sections, designated 20, extend rearwardly therefrom, along each side of the room. Between the sections 20, the track loops back and forth a number of times, as at 22.

Figure 2:
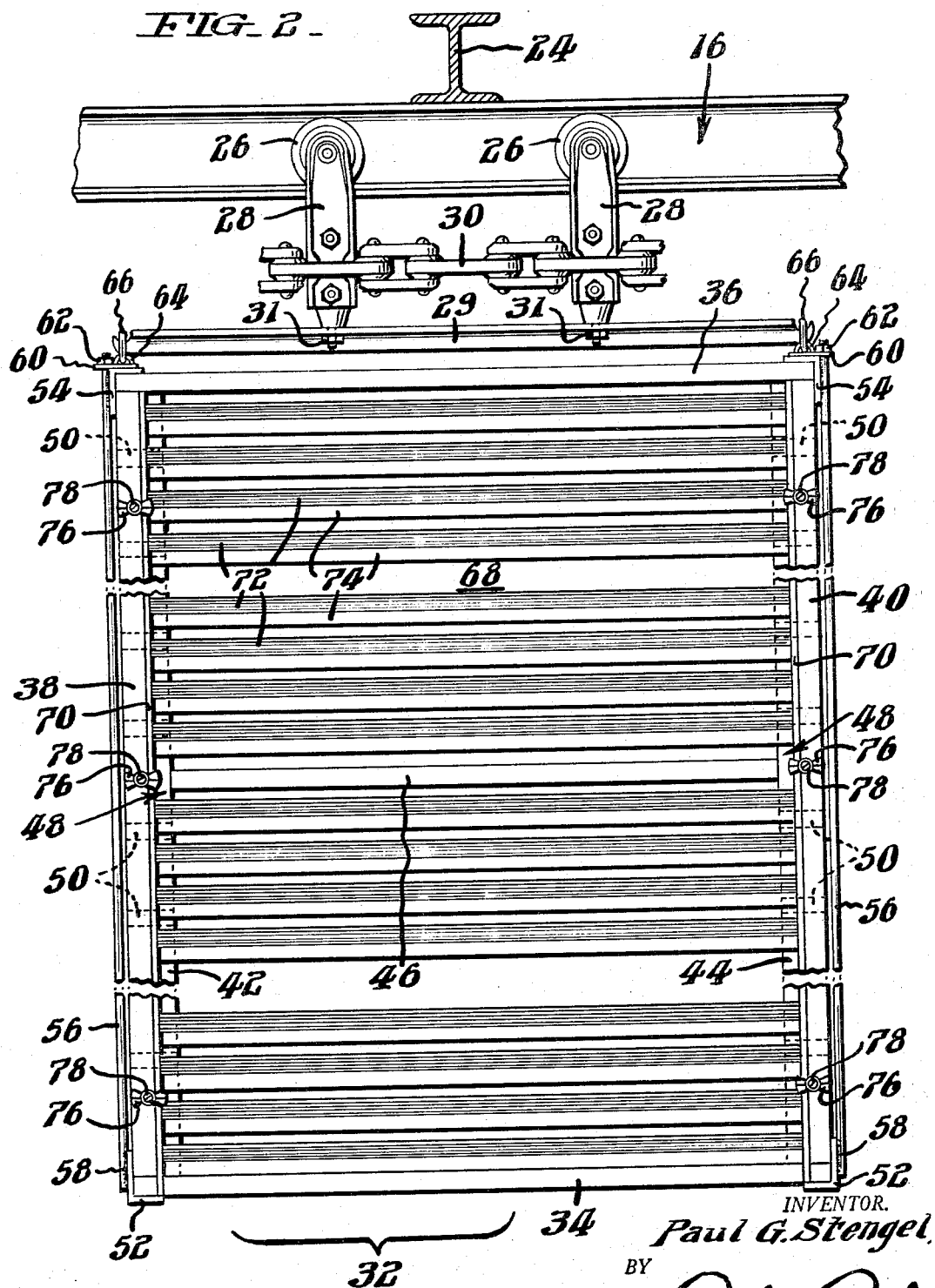
FIGURE 2 is an elevation showing a frame suspended from a trolley conveyor system in the growing room.

Referring particularly to FIGURES 2 and 3, the track 16 is suspended from the frame of the building, generally designated 24. At intervals along the track 16, and on opposite sides thereof, respectively, are trolley wheels 26 from which depend brackets 28. The brackets 28 carry a chain 30 and a series of bars 29 secured to the chain by means of bolts 31. The trolley conveyor system is provided with suitably arranged drives, turns and pickups. The drives are variable, and suitable controls (not shown) are arranged within easy reach of the operator, at the front end of the growing room 12. It will be noted that the closed end of each track loop 22 is as small in diameter as practicable and greater in diameter than the spacing between adjacent pairs of track loops 22. This increases the capacity of the growing room. Suspended from each bar 29 is a frame, generally designated 32, which may be generally of the types disclosed in my copending application Ser. No. 349,905, filed Mar. 6, 1964.

As shown, the frame has horizontally extending bottom and top members, respectively designated 34 and 36, and upright opposite end members, respectively designated 38 and 40. The end members 38 and 40 are fitted respectively with liners 42 and 44, and the frame is divided into upper and lower sections by a horizontally extending divider 46. All of the members aforesaid may be 2 by 8 timbers except the end members 38 and 40, which should be 2 by 12 timbers in order to provide on each side of the frame and at each end thereof a recess 48. The frame may be made, for example, 4 feet wide and 10 feet high. The opposite end members and their liners may be provided with vent holes 50. The opposite end portions of the member 34 are seated respectively upon corner brackets 52, to which are affixed the lower end portions of vertically extending tie rods 56, as by welding 58. The upper end portions of the rods 56 extend respectively through a pair of plates 60 fitted with nuts 62. The plates 60 overlie and are affixed respectively to a pair of corner brackets 54. Affixed to the tops of the plates 60 respectively are staples 64, and extending through each staple is a ring 66 hooked over the associated end of a bar 29.

Fitted over each side of the frame 32 is a metal grille, generally designated 68. The grille includes laterally spaced upright bars 70 respectively disposed in recesses 48. Spanning the bars 70 are a series of horizontally extending slots 72, each bent, as at 74. The frame is provided with a number of keeper elements 76 secured to the wooden frame by means of screws 78.

Referring particularly to FIGURES 3, 4 and 5, the casing machine illustrated is provided with a dirigible frame, generally designated 80, having a longitudinally extending member 82, a transversely extending member 84 at the rear thereof rigidly secured to the member 82 and mounting a pair of widely spaced rear wheels 86. Pivoted to the fore end of the number 82 is a transversely extending member 88 mounting a pair of widely spaced front wheels 90. Mounted upright upon the member 80 is a frame, generally designated 92, including an upright channel member 94 at the front end thereof, an upright channel member 96 at the rear end thereof and a horizontally extending channel member 98 spanning the members 94 and 96.

Disposed within the frame 92 is a hopper, generally designated 100, provided with downwardly converging opposite side walls 102 and upright front and rear walls 106. The top of the hopper is open, as at 108, and the bottom of the hopper is open, as at 110. The walls 106 are fitted with sleeve bearings 112 which receive a shaft 114 fitted with agitator blades 116.

Extending from the bottom of the hopper 100 is an inclined chute, generally designated 118, having a bottom wall 120, a top wall 122 and opposite side walls 124. The head of the chute, generally designated 126, is hooked at the front and rear of the hopper, as at 128, over pins 130 extending from the walls 106. The mouth of the chute is fitted with a flexible wiper 132, and the chute is supported from the hopper 100 by means of a pair of suitable hangers 134. Opposite end portions of the shaft 114 are fitted respectively with a pair of pinions 136 which mesh with vertically extending racks 138 affixed to the flanges of channel members 94 and 96. The opposite end portions of the shaft 114 are also fitted with rollers 140 which engage runners 142 affixed to the other flanges of channel members 94 and 96. Extending across the top of the hopper and affixed thereto is a rod 144, and engaged with the rod is a hook 146 from which there extends upwardly a cable 148 wound about a drum 150. One end of the drum is supported by a bearing 152 while the opposite end is supported by a reducer 154 driven by an electric motor 156. Extending from the motor 156 are wires 158 leading to an "up-down" switch 160.

The casing machine is loaded with casing soil through the open top 108 and is positioned opposite a frame 32, whereupon the chute 118 is adjusted at the proper angle and so that the wipers 132 engage the face of the grille 68. The "up" button of switch 160 is depressed, whereupon the motor 156 is energized. Through the reducer 154 the motor operates the drum 150 whereby to take up the cable 148 on the drum 150. Thus the hopper 118 is elevated. As the hopper 118 moves upwardly, the pinions 136 meshing with racks 138 turn the shaft 114 and the agitator blades 116. The rollers 140 move over the runners 142 and keep the pinions 136 engaged with racks 138. Thus casing soil is fed down the chute 118, and as the chute is elevated, soil is deposited on the slats 72. A suitably located limit switch (not shown) is operated by the hopper to terminate the upward movement. Now the "down" button of the switch 160 is depressed, whereupon the motor is reversed and the hopper and chute are relowered. A cut-off gate (not shown) operates to terminate discharge from the hopper 100 into the chute 118. A suitably located limit switch (not shown) is operated by the hopper to terminate downward movement.

Referring again to FIGURE 1, a spraying booth, generally designated 162, may comprise a suitable curtain 164, for example, made of canvas, and suitably arranged spray heads 166 connected with a suitable source of water. Controls (not shown) are provided for controlling temperature, pressure and fineness of spray.

In order to fill a frame 32 its grilles 68 are removed, and the frame is placed horizontally upon a platen (not shown). The frame is then filled with partially conditioned compost and covered with a grille 68. Then the entire assembly is turned upside down, the platen removed and the other grille 68 replaced. The loaded frame is now upended and placed upon a pallet 174. The pallet, loaded with a series of frames spaced about six inches apart, is then moved by fork lift truck to the pasteurization room 14, and the pallets, loaded with the frames, are arranged in rows, as shown. Any other means of loading the frames with compost and transporting them to the pasteurization room may be used. In this connection reference may be had to my copending patent application Ser. No. 349,905, filed Mar. 6, 1964.

Now the pasteurization room is tightly closed, except that the doors are opened at intervals to admit a fresh supply of oxygen. The heat generated by the bacterial action in the compost, in combination with the moisture, causes the temperature to rise and resulting pasteurization brings about a final conditioning of the compost as well as killing off any insects or molds which may have gotten into the room. The temperature is allowed to reach 150° F. Then the room is ventilated and the temperature is allowed to drop to 75° F. The entire pasteurization process requires about two weeks.

When the temperature has dropped to 75° F., the compost is ready for the spawn. The spawn carrier is broadcast by simply reaching in between each pair of frames and placing the carrier upon the slats 72 of the grilles 68. The spawn carrier rests upon the slats 72, against the compost.

Now the frames are removed from the pasteurization room by fork lift truck and transported to the growing room, whereupon they are suspended one by one from the chain 30 of the trolley conveyor system by means of bars 29, as shown. With a full complement of frames suspended from the trolley conveyor system, the arrangement is as shown in FIGURE 1. It will be noted that one bar 29 is left without a frame to provide an access opening, as at 168, for passage of workmen back and forth. If desired, pasteurization may be effected in the growing room instead of in a separate room. In this event, of course, spawning also takes place in the growing room.

The spawn begins to grow into the compost from both sides of the frame, and in two weeks the mycelium grows through the compost and covers every strand thereof.

During the spawn running period, the air humidity and moisture content of the compost are kept very high. The air humidity is kept at approximately 90–95 percent, and the moisture content of the compost is kept at approximately 60–70 percent.

The trolley conveyor system is operated periodically to advance the frames 32. The frames pass through a casing station 170 serially. When a frame stops at the casing station, the casing machines, there being one on each side of the frame, are operated and both sides of the frame are cased simultaneously, as described hereinbefore, in one upward sweep.

After all the frames are cased, the watering system is turned on, and the trolley conveyor system moves the frames through the booth 162 serially at a predetermined rate. As the frames pass through the watering station or booth 162, they are sprayed with water. The water temperature, fineness of spray and rate of water delivery may be regulated to meet the need for water. The spray is uniform—all over both sides of the frames. Within five days the spawn grows through the casing layer. While the spawn is growing through the casing layer, the air humidity is maintained at approximately 90 percent and the moisture content of the casing soil is maintained at approximately 90 percent. Watering commences again after the mycelium covers the top of the casing soil and is repeated as often as required. The number of waterings and the amount of water sprayed depends upon the condition of the soil, which is determined by the operator. The success of the crop depends on his good judgment, developed by long experience.

Three weeks from the time the frames are cased, the first flush of mushrooms is ripe for picking. The temperature in the growing room is not permitted to rise above 70° F., and preferably is kept between 50° and 65° F. During the cropping period, the air humidity is kept at approximately 80 percent, and the moisture content of the casing soil is kept at approximately 50–90 percent. The frames are advanced at a predetermined rate through picking, cleaning and dirting stations, generally designated 172, and the watering station 162. The pickers select and pick mushrooms, which if desired, may be picked and made ready for shipment in the same area or, if desired, may be taken to another area and made ready for shipment. When select picking is not desired, automatic picking machines may be used to advantage. After the mushrooms are picked, the frames are cleaned, i.e., remains of broken mushrooms and dead mushrooms are removed. Then voids in the casing soil layer are filled (dirting). Each of these steps is carried out simultaneously by workers on opposite sides of a frame. After dirting, the frames are sprayed lightly with water.

It should be noted that the specific order of the several stations is not material. In fact, the dirting operation is omitted altogether by some operators.

After a full crop has been picked, the frames are loaded on pallets again, removed from the growing room, dumped, cleaned, and sterilized. In the meantime, another full complement of frames has been pasteurized and spawned and made ready for the growing room.

As pointed out hereinbefore, in a growing room 36 feet wide and 66 feet long, stationary shelves may be arranged to provide approximately 8,000 square feet of bed area. By using a movable tray system, this bed area may be increased by about 30 percent. But by using the system of this invention the bed area may be increased by at least 50 percent.

It should be noted that the frames preferably are put in the growing room after the compost has been pasteurized and spawned and are removed therefrom at the end of the cropping period. Since it requires two weeks for the mycelium to grow through the compost, an additional three weeks before picking commences and only an additional six weeks for cropping, the crop ties up the growing room for only approximately twelve weeks. Thus the operator, if he so desires, may grow three crops a year instead of two.

Obviously, since the frames are always in an upright position, the operations of planting the spawn, picking the mushrooms, and watering, cleaning and dirting are facilitated.

The problem of watering at the right times and administering the correct amount of water remain. These depend solely upon the good judgment of the operator. But at least the problem of even distribution of the water required is solved. This critical operation is not carried out manually, but mechanically.

What is claimed is:

1. Apparatus for commercially cultivating mushrooms, the combination comprising an endless track enclosed conveyor system, a series of shallow upright frames adapted for mushroom cultivation on each side thereof, means for suspending said frames from said tracks, casing means at a station adjacent said conveyor and adapted for the casing of at least one side of each frame as it passes by said casing station, and a spray means at a second station adjacent said conveyor and adapted for spraying at least one side of each frame as it passes by said spraying station.

2. The combination according to claim 1 wherein the casing means is adapted for casing both sides of each frame simultaneously, and the spraying means is adapted for spraying both sides of each frame simultaneously.

3. The combination according to claim 1 wherein picking and cleaning stations are provided and the casing, picking, cleaning and spraying stations are arranged serially along the path of the frames.

4. The combination according to claim 3 wherein the endless track of the enclosed conveyor system is provided with a U-shaped part and a part which loops back and forth within the space between the legs of the U-shaped part, and the casing picking, cleaning and spraying stations are arranged along the section of the U-shaped part which connects the legs of the U-shaped part.

References Cited by the Examiner

UNITED STATES PATENTS

| | | | |
|---|---|---|---|
| 2,244,677 | 6/1941 | Cornell | 47—17 |
| 2,824,410 | 2/1958 | Daw | 47—1 |

FOREIGN PATENTS

| | | |
|---|---|---|
| 163,369 | 6/1955 | Australia. |
| 301,474 | 7/1916 | Germany. |

ABRAHAM G. STONE, *Primary Examiner.*

R. E. BAGWILL, *Assistant Examiner.*